G. H. ZOUCK.
BLOWPIPE.
APPLICATION FILED OCT. 28, 1918.

1,310,100.

Patented July 15, 1919.

George H. Zouck
Inventor

By his Attorneys
Pennie Davis Marvin & Edmonds

UNITED STATES PATENT OFFICE.

GEORGE H. ZOUCK, OF ORANGE, NEW JERSEY, ASSIGNOR TO AIR REDUCTION COMPANY, INCORPORATED, A CORPORATION OF NEW YORK.

BLOWPIPE.

1,310,100.      Specification of Letters Patent.      Patented July 15, 1919.

Application filed October 28, 1918. Serial No. 259,893.

*To all whom it may concern:*

Be it known that I, GEORGE H. ZOUCK, a citizen of the United States, residing at Orange, in the county of Essex, State of New Jersey, have invented certain new and useful Improvements in Blowpipes; and I do hereby declare the following to be a full, clear, and exact description of the invention, such as will enable others skilled in the art to which it appertains to make and use the same.

This invention relates to blow pipes or torches, and has for its primary object, the provision of an inexpensive, simple and efficient blow pipe structure in which the gas inlet passages are securely sealed to prevent premature mixing of the gases and including a replaceable tip so constructed as to insure a proper relation by volume of combustible and oxidizing gases delivered to the discharge passage of the tip.

Figure 1:
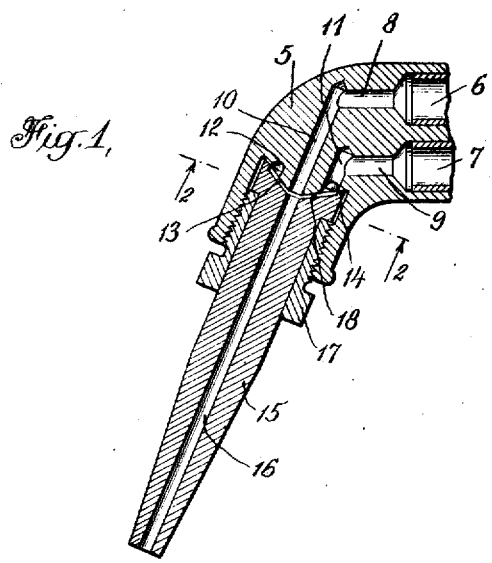
Figure 2:
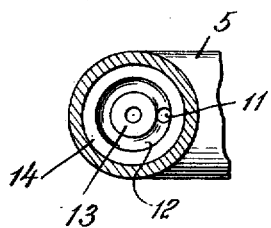
Figure 3:
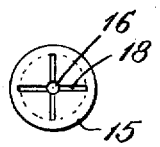

Further objects and advantages of my invention will be apparent, as it is better understood, by reference to the following specification when taken in connection with the accompanying drawing illustrating the preferred embodiment thereof, in which Figure 1 is a longitudinal section through the head and tip of a welding blow pipe or torch; Fig. 2 is a transverse section through the head and Fig. 3 is an end elevation of the tip.

Numerous forms of blow pipes have been heretofore designed, involving many different structures, but so far as applicant is aware, all have been subject to such disadvantages as leakage and premature mixing of the gases, liability to back firing and general expensiveness of construction due to the number of parts employed and to intricacy of operations necessary in manufacture. The blow-pipe forming the subject matter of the present application has been devised to overcome all of these numerous difficulties and to provide a structure which embodies, with the utmost simplicity, all of the desirable characteristics of an efficient blow-pipe capable of long continued use to perform its desired function.

Referring to the drawing, 5 indicates a head to which two pipes 6 and 7 are secured and adapted to convey a supply of oxygen and of a combustible gas respectively. Within the head are provided two passages 8 and 9 communicating with the pipes 6 and 7. Passage 8 has a branch 10 axially disposed within the head and the passage 9 has a branch 11 terminating in a channel 12 surrounding the branch 10 of the passage 8. The head 5 is provided with a seat having two conical surfaces 13 and 14 between the end of the branch 10 and the channel 12 and between the channel 12 and the wall of the head.

The tip 15 comprises a single piece having a longitudinal bore or outlet passage 16 axially disposed and adapted to aline with the branch 10 when the tip is held in assembled relation with the head by a threaded nut 17. The inner end of the tip is provided with a conical recess corresponding to the conical surfaces 13 and 14 and adapted, when engaged therewith, to form a gas-tight seal between the branch 10 and the channel 12 and between the channel 12 and the wall of the head. To permit the passage of gas from the channel 12 to the passage 16, I provide a series of grooves or depressions 18, which may be formed by a milling operation or by pressing, in the surface of the conical recess at the inner end of the tip.

As will be readily understood, the oxygen supplied through the pipe 6 is delivered through the passage 8 and the branch 10 thereof directly to the discharge passage 16 of the tip. The combustible gas is delivered from the pipe 7 to the passage 9 and branch 11 thereof to the channel 12 and thence passes through the grooves 18 and is mixed with the oxygen from the branch 10 at the mouth of the discharge passage 16 and before the oxygen has entered the discharge passage. The result is a thorough and complete mixture of the gases before they are discharged from the tip.

Tips having discharge passages of different sizes are normally employed with the same head, the tips being interchangeable and replaceable by simply removing the nut 17. By properly proportioning the grooves 18 any desired mixture of oxygen and combustible gas, suitable to the size of the discharge passage 16 may be provided for and a proper mixture is always insured. The seals formed by engagement of the surface of the conical recess with the conical surfaces in the head, insures an absolutely gas-tight joint, so that premature mixing of the gases or escape thereof, other than through the discharge passage, is prevented.

The structure is exceedingly simple, requiring a minimum number of manufacturing operations, as will be readily apparent from an inspection of the drawing, and I have thus provided a blow-pipe adapted to be manufactured at a minimum expense and to be supplied in large quantities for commercial use. The only portion of the blow-pipe which is liable to wear or injury, is the tip, and this may be readily replaced, should it be injured by misuse, and the blow-pipe may thus be restored to its original condition.

While the preferred embodiment of the invention has been shown, it will be understood that various changes in the details of construction may be made, without departing from the principle of the invention.

I claim—

1. A device of the character described comprising a head having passages for oxidizing and combustible gases and a seat having a projecting conical surface surrounding the ends of both of said passages, a tip having a discharge passage, and a recess at its inner end provided with a conical surface conforming to the surface of said seat and forming therewith a gas tight joint, one of said conical surfaces having a groove therein, forming a path whereby the gas from one of the passages in said head is delivered to and mixed with the gas issuing from the other passage and means for holding said tip in assembled relation with said head.

2. A device of the character described, comprising a head having passages for oxidizing and combustible gases and a projecting conical seat surrounding the ends of both of said passages, a tip having a discharge passage, a conical recess at its inner end conforming to said seat and forming therewith a gas tight joint and a groove in the face of said conical recess forming a path whereby the gas from one of the passages in said head is delivered to and mixed with the gas issuing from the other passage and means for holding said tip in assembled relation with said head.

3. A device of the character described, comprising a head having passages for oxidizing and combustible gases and a projecting conical seat surrounding the ends of both of said passages, a tip having a discharge passage, a conical recess at its inner end conforming to said seat and forming therewith a gas tight joint and a plurality of grooves in the face of said conical recess forming a path whereby the gas from one of the passages in said head is delivered to and mixed with the gas issuing from the other passage and means for holding said tip in assembled relation with said head.

4. A device of the character described, comprising a head having passages for oxidizing and combustible gases and a projecting conical seat surrounding the ends of both of said passages, a tip having an axial discharge passage, a conical recess at its inner end conforming to said seat and forming therewith a gas-tight seal, said discharge passage being in alinement with one of the passages in said head and a radial groove in the face of said conical recess connecting the passages in said head whereby the two gases are mixed at the mouth of the two gases are mixed at the mouth of said discharge passage and means for holding said tip in assembled relation with said head.

5. A device of the character described, comprising a head having passages for oxidizing and combustible gases and a sealing surface surrounding the ends of both of said passages, a tip having a discharge passage and a surface conforming to said sealing surface and coöperating therewith to form a gas-tight joint, and a radial groove in one of said surfaces connecting the passages in said head, whereby the two gases are mixed at the mouth of said discharge passage when said tip is held in assembled relation with said head.

6. A device of the character described, comprising a head having passages for oxidizing and combustible gases and a sealing surface surrounding the ends of both of said passages, a tip having a discharge passage and a surface conforming to said sealing surface and coöperating therewith to form a gas-tight joint, and a plurality of radial grooves in one of said surfaces connecting the passages in said head, whereby the two gases are mixed at the mouth of said discharge passage when said tip is held in assembled relation with said head.

7. A device of the character described, comprising a head having an axial passage for oxidizing gas, an adjacent passage for combustible gas and a sealing surface surrounding said axial passage, an annular channel in said sealing surface between its periphery and said axial passage, a tip having a surface conforming to said sealing surface and forming therewith a gas-tight joint, a discharge passage in alinement with said axial passage, and a plurality of grooves radiating from the mouth of said discharge passage to said channel, whereby said gases are mixed at the mouth of said discharge passage when said tip is held in assembled relation with said head.

8. A device of the character described comprising a head having passages for oxidizing and combustible gases, a projecting conical seat and a channel in said seat, a tip having a discharge passage, a conical recess at its inner end conforming to said seat and forming therewith a gas-tight joint and a plurality of grooves in the face of said recess radiating from the mouth of said discharge passage to said channel whereby said gases are mixed at the mouth of said discharge passage and means for holding said tip in assembled relation with said head.

9. A device of the character described comprising a head having two passages for oxidizing and combustible gases respectively, said passages terminating in a projecting conical seat, a channel in said seat communicating with one of said passages, a tip having a conical recess at its inner end adapted to engage said seat and to form a gas-tight joint therewith, a discharge passage in alinement with one of the passages in said head, a plurality of radial grooves in the recessed end of said tip connecting said channel and the mouth of said discharge passage and means for holding said tip in assembled relation with said head.

10. A device of the character described comprising a head having passages for oxidizing and combustible gases and a flattened projecting conical seat surrounding the ends of both of said passages, a tip having a discharge passage and a conical recess in its end conforming to said seat and forming therewith a gas-tight joint, a groove in the recessed end of said tip connecting the passages in said head and means for holding said tip in assembled relation with said head.

11. A device of the character described comprising a head having a seat and passages for oxidizing and combustible gases terminating therein, and a tip having a discharge passage in alinement and communicating with one of the passages in said head, a surface conforming to said seat and a groove in said surface connecting the passages in said head when said tip is assembled therewith.

12. A device of the character described, comprising a head having a projecting conical seat and passages for oxidizing and combustible gases terminating therein, and a tip having a discharge passage communicating with one of the passages in said head, a conical recess at its inner end having a surface conforming to said seat and forming therewith a gas tight joint and a groove in said surface connecting the passages in said head when said tip is assembled therewith.

13. A device of the character described, comprising a head having a seat and passages for oxidizing and combustible gases terminating therein, and a tip having an axial discharge passage communicating with one of the passages in said head, a surface conforming to said seat and a groove in said surface extending radially from the mouth of said discharge passage to the other passage in said head, said surface coöperating with said seat beyond the end of said groove to prevent escape of gases when said tip is assembled with said head.

14. A device of the character described, comprising a head having a seat, an axial passage terminating therein, an annular channel medially disposed in said seat surrounding said passage, and a second passage terminating in said channel, and a tip having a discharge passage in alinement and communicating with the axial passage in said head, a surface conforming to said seat and a groove in said surface between the mouth of said discharge passage and channel, said surface coöperating with said seat to prevent escape of gases when said tip is assembled with said head.

15. A device of the character described, comprising a head having a projecting conical seat, and passages terminating in said seat, and a tip having a discharge passage, a surface conforming to said seat and a groove in said surface connecting said passages, said surface extending beyond the end of said groove and preventing escape of gases when said tip is assembled with said head.

In testimony whereof I affix my signature.

GEORGE H. ZOUCK.